United States Patent Office 3,086,447
Patented Apr. 23, 1963

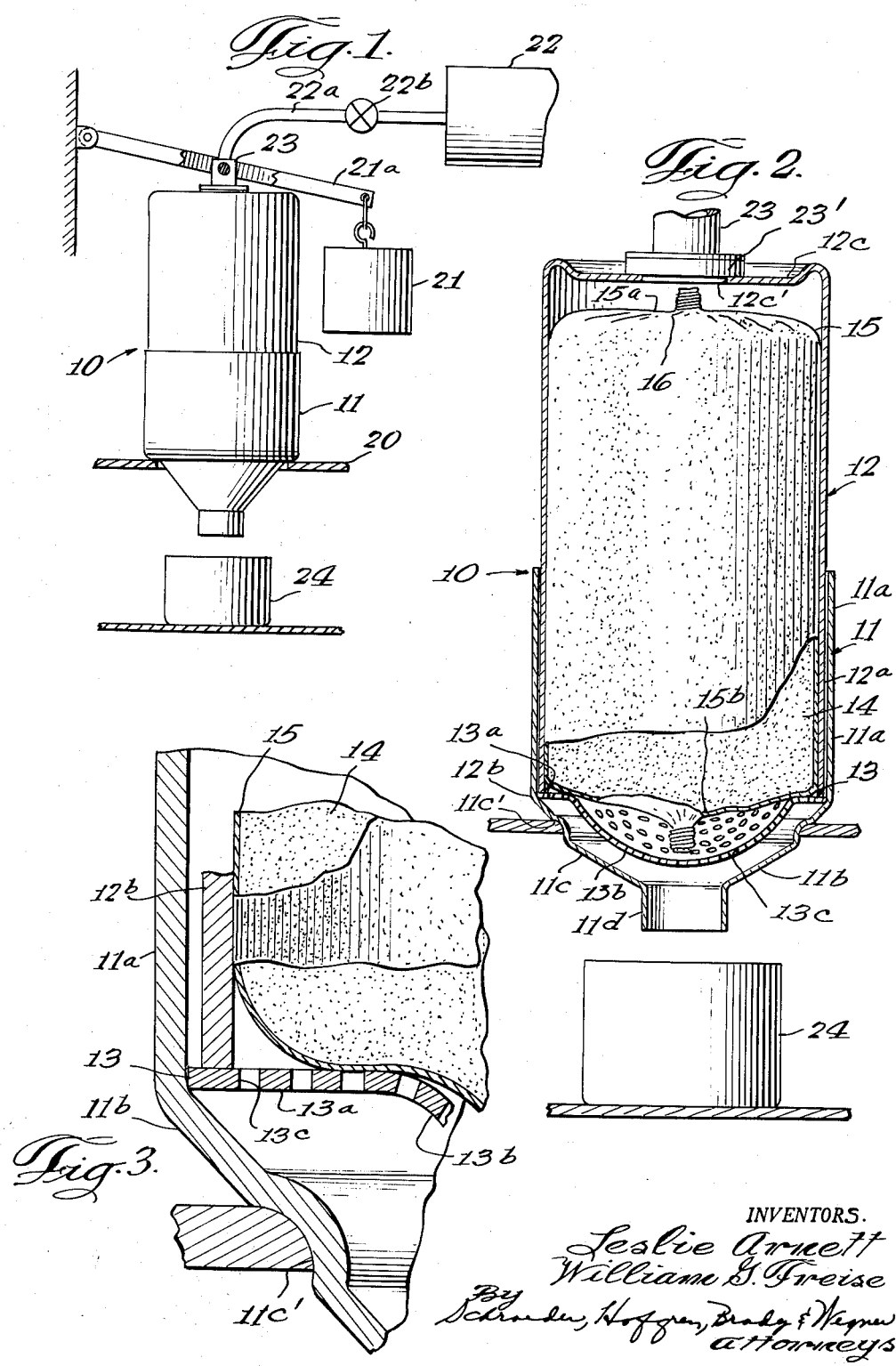

3,086,447
PERCOLATOR
Leslie Arnett and William G. Freise, Chicago, Ill., assignors to United Coffee Corp., a corporation of Illinois
Filed May 11, 1955, Ser. No. 507,688
1 Claim. (Cl. 99—295)

This invention relates to a percolator and more particularly to a percolator for brewing pre-bagged coffee under pressure.

Different forms of automatic apparatus for preparing and dispensing beverages such as coffee and tea are known in the art. Such apparatus, normally, utilizes one of two different methods of preparing the beverage, i.e. either (1) mixing powdered soluble material in heated water, or (2) percolating heated water through a charge of particulate material. Coffee produced by the first of these methods is substantially inferior in taste and quality to the coffee produced by percolation.

An exemplary embodiment of an apparatus for brewing and dispensing percolated coffee is disclosed in copending application Serial No. 336,563, filed February 12, 1953, Patent No. 2,761,200, issued September 4, 1956. Generally, this coffee brewer comprises a storage tank for receiving and heating water under pressure, a percolator container having an internal, transverse member supporting a charge of ground coffee within the container, means for conducting the heated, pressurized water from the tank and into the top of the percolator container, means for receiving the infusion resulting from the passage of the pressurized, heated water through the coffee charge, and means for discharging the brewed coffee infusion when desired into a cup. A plurality of percolators are provided, each of which discharges into the above described receiver, and automatic means are incorporated to selectively, sequentially utilize the percolators in brewing the coffee.

A principal feature of this invention is the provision of a new and improved percolator for use in a beverage brewing apparatus, as above described.

Another feature is the provision of a percolator for use in a beverage brewing system, having a container with a perforate bottom, a charge of particulate material for preparing an infusion contained in a sealed bag and carried in the container, and means for introducing heated liquid to the container to pass through the charge preparing a beverage, the liquid causing the particulate material to expand and seal against the wall of the container.

A further feature is the provision of a percolator, as described above, wherein the bag has substantially the same cross-scetional size as the container.

Still another feature is that the bag is provided with gathered ends to allow free flow of the beverage liquid therethrough.

Yet a further feature is that the percolator is provided with a downwardly dished member for supporting the bag in the container which is adapted to prevent the bag from being caught between abutting portions of the container.

Other features and advantages of this invention will be apparent from the following description taken in connection with the accompanying drawings, wherein:

FIGURE 1 is a diagrammatic view of a coffee brewing apparatus illustrating the use of a percolator embodying the invention;

FIGURE 2 is an enlarged vertical sectional view of the percolator; and

FIGURE 3 is an enlarged fragmentary view mainly in section of a portion of the percolator.

Turning now to FIGURE 1, a percolator 10 is shown to comprise an outlet member 11 in which is telescopically received a cover 12. Container 10 carries interiorly a charge of ground coffee through which pressurized, heated water from source 22 is passed. Means for conducting the water from source 22 comprise a duct 22a having suitable valve means 22b and which is secured to the upper end of the container 10 in fluid conductive relationship to the interior of the container by a sealing coupling 23. Container 10 is disposed vertically with the outlet member 11 lowermost and projecting through a supporting shelf 20. For forcibly urging the coupling 23 into sealing engagement with the container 11, a weight 21 is provided acting through a lever arm 21a which is secured to the coupling. The receiving means into which the infusion is discharged is illustratively shown as tank 24 disposed directly below the outlet member 11. Although in normal usage a plurality of such percolators may be incorporated in the brewing apparatus, the structure of each is similar, and the description here is limited to one only with the understanding that this in no way limits the scope of the invention.

In the utilization of brewing apparatus employing a plurality of percolators each containing a fresh charge of ground coffee, it is necessary after each of the percolators has been used to replace the exhausted percolators with freshly charged ones. This may be accomplished in either of two ways, namely: removing the exhausted percolator, discarding the exhausted charge, cleaning the container, and inserting a fresh charge; or removing and discarding the entire exhausted percolator including the container. The percolator of this invention is suitable for either method, being of small size and economical construction whereby it may be considered as disposable, and yet of construction suitable for repetitive use by cleaning and replacement of the coffee charge therein.

The specific construction of our percolator will now be described in more detail, particular reference being had to FIGURES 2 and 3 of the drawings. The percolator is seen to comprise container 10 having a tubular outlet member 11 provided with a longitudinally extending cylindrical portion 11a and having a constricted end 11b. End 11b comprises a generally frusto-conical portion 11c and a reduced diameter longitudinally extending portion or spout 11d. Telescopically received within the cylindrical portion 11a of the outlet member is open end 12a of the tubular cover 12. When cover 12 is fully inserted into the outlet member, the inner end 12b of end 12a abuts a screen 13 having resting engagement with outlet member portion 11c. As the fit between cover portion 12a and outlet body member 11a is relatively loose, the container may be readily assembled and disassembled. A groove 11c' may be provided in portion 11c for accommodation of the outlet member to shelf 20 to assist in the upright positioning of the percolator thereon.

At its outer end cover 12 is provided with a transversely extending portion 12c having a central opening 12c'. Coupling 23 is arranged to be sealingly engaged with the transverse portion 12c for connecting the duct 22a in fluid conductive relationship with the interior of the cover 12. Coupling 23 may be of any suitable type and preferably includes a resilient gasket 23' held in sealing engagement with portion 12c of the cover by weight 21, allowing ready removal and replacement so that the percolator may be easily removed from and replaced in the brewing apparatus.

The coffee charge comprises a quantity of ground coffee 14 which is contained in a disposable filter bag 15. Bag 15 is preferably formed of filter paper of the type commonly used for tea bags, and acts to both carry the ground coffee interiorly and filter the infusion produced therein. Screen 13 in addition to supporting cover end 12b is adapted to support coffee bag 15 and to this end, screen 13 is provided with a peripheral radially extending portion 13a. The central portion 13b of screen 13 is dished downwardly toward discharge spout 11b. Disk center 13b is preferably semispherical and is provided with a plurality of relatively small diameter holes 13c. A considerable enlargement of the foraminous area of screen 13 through which the infusion passes is effected by the semispherical configuration relative to the lateral cross-sectional area of the outlet cylindrical portion 11a resulting in increased flow of the brewed infusion therethrough. As screen periphery 13a has resting engagement with the outlet member, screen 13 may be readily separated therefrom for purposes of cleaning.

Bag 15 has a cross-section when fully extended transversely at least equal to the transverse cross-section of the interior of cover 12 and a longitudinal extension substantially greater than and at least twice the transverse extension. Upon admittance of the pressurized, heated liquid to the interior of container 10 through the opening 12c' at the top of the cover 12, the coffee charge will be thrust downwardly by the action of the liquid in passing through the charge; such downward displacement acts to force the bottom central portion of bag 15 into semispherical screen portion 13b, and to effect a lateral displacement whereby the bag 15 will be urged into tight engagement with the inner surface of the longitudinal portion 12a of cover 12 and effectively seal the coffee charge completely across the container. Such arrangement causes all liquid passing through the container 10 to pass through the coffee charge thereby maximizing the efficiency of the percolation process; and as an effective seal is had between the coffee charge and the container cover 12, a seal between the cover 12 and the outlet member 11 is made unnecessary thereby allowing simplification of the structure with attendant ease of servicing. The pressure gradient through the coffee charge is uniform and as the pressure at the bottom of the bag 15 is the same as that in the spout 11d (which in this embodiment is shown to be atmospheric) there will be little tendency for the brewed infusion to force its way between the abutment of the outlet member 11 and the cover 12 to leak from the container, notwithstanding the lack of a seal therebetween. Further, the bag is urged against the screen 13 with a relatively light force so that flow of the infusion into and through screen openings 13c is relatively free.

While the load cycle of automatic coffee brewers is such that at certain periods a large quantity of coffee may be required to be dispensed over a short period of time, we have found that instances arise wherein a small number of cups of coffee are dispensed and no additional coffee is required for a protracted period of time. The percolators now found in the art are adapted to prepare a relatively large quantity of coffee so that a single percolator or a small number thereof may provide sufficient coffee for the maximum requirement, often a large quantity of coffee is retained for considerable periods of time with consequent possible undesirable effects on the quality thereof. The percolator of this invention is of a relatively small size, adapted to hold a maximum of approximately one-quarter pound of ground coffee. Because of the novel, simple construction of the percolator, the use of a relatively large number of such small quantity percolators in a brewing apparatus is commercially practicable. Through use of such small quantity percolators, the brewing apparatus may accommodate a considerable range of quantity requirements by utilizing a single percolator or any number thereof up to all the available percolators in the apparatus.

The construction of the bag 15 is an important factor in the efficient utilization of the percolator. It has been found that where the ends of the bag are allowed to fold over on themselves as will happen where the bag is sealed along a straight seam, the time necessary for a complete brewing cycle may be two to three times that required where a single layer of bag material extends across each end. A simple and effective means for insuring that only a single layer of filter material covers the ends 15a and 15b of the bag is to gather the ends centrally of the bag and seal them as with a cord or bond 16 or with a metal clip. Such construction provides a simple and effective method of closing the bag 15 at each of its ends and minimizes the area of impeded flow at the ends.

In loading the percolator, screen 13 is placed with its periphery 13a resting on the frusto-conical portion 11c of outlet member 11 with portion 13b extending convexly downwardly. Bag 15 containing the charge of ground coffee is inserted into the open end 12a of the cover 12 and the assembly of the bag and cover is then telescopically inserted into the cylindrical portion 11a of the outlet member 11 until the cover end 12b abuts the screen periphery 13a. The bottom of bag 15 also rests on the screen periphery 13a. The assembled percolator is then installed in the brewing apparatus with the spout 11a directed downwardly. Duct 22a leading from the source of heated water 22 is then connected to the cover 12 by means of sealing coupling 23.

When valve 22b is actuated to allow heated, pressurized water to enter the percolator, the brewing of the coffee is effected. The coffee infusion is discharged from the lower end of the bag 15 which acts to filter it and then passes through the screen 13 and outwardly of the container 10 through the spout 11d into the receiver 24. The percolator may then be discarded in its entirety or if re-use of the container 10 and support screen 13 is desired, the exhausted coffee charge may be removed and discarded, and the container and screen suitably cleaned by washing and sterilizing. Where replacement of the complete percolator is to be made, the entire servicing operation is performed at the brewing apparatus. Where the containers and screens are to be re-used, it is normally anticipated that they will be removed from the brewing apparatus and taken to a central kitchen for washing and refilling. As all parts of the percolator are readily separable and extremely simple of construction, the cleaning and sterilization are easily effected.

Container 10 and screen 13 are preferably formed of a thin metal such as steel. Where re-use of the container and screen is anticipated, the use of a stainless steel is preferred, to improve durability and ease of cleaning. A disposable container and screen may be of the typical "tin can" construction wherein a thin walled ferrous container is coated interiorly with tin or a plastic or may be formed entirely of moldable plastic.

While we have shown and described certain embodiments of our invention, it is to be understood that it is capable of many modifications. Changes, therefore, in the construction and arrangement may be made without departing from the spirit and scope of the invention as defined in the appended claim.

We claim:

A percolator of the character described for use with prebagged beverage charges and arranged to be installed as a package in a suitable dispensing machine, comprising: a tubular vertically extending housing including an elongated, cup-shaped part having a closed upper end provided with an inlet opening, and a closure part having a transverse portion extending across the open lower end of the cup-shaped part and provided with a discharge opening and a tubular portion readily removably telescoped over said open end, a charge of beverage ingredient in said housing, said charge being retained in a bag having centrally gathered opposite ends and extending transversely across the housing into sealing engagement with the inner wall surface of said cup-shaped part, said sealing engagement being over a full 360° concentrically of the axis of the cup-shaped part and substantially the full length of the bag between said gathered ends; and a perforate member extending transversely across said open end of the cup-shaped part inwardly of said closure, said member being concave toward and centrally of said cup-shaped part for supporting the bagged charge annularly adjacent said inner wall surface of the cup-shaped part and permitting the center of the lower end of the bag to project thereinto coaxially of the inner wall surface of the cup-shaped part.

References Cited in the file of this patent

UNITED STATES PATENTS

| | | |
|---|---|---|
| 169,626 | Crowell | Nov. 9, 1875 |
| 228,862 | Blanchard | June 15, 1880 |
| 561,515 | Morian | June 2, 1896 |
| 636,489 | Clarke | Nov. 7, 1899 |
| 807,547 | Fliegel | Dec. 19, 1905 |
| 1,083,900 | Brown | Jan. 6, 1914 |
| 1,335,048 | Diefendorf | Mar. 30, 1920 |
| 1,412,388 | Clermont | Apr. 11, 1922 |
| 1,953,291 | De Vry | Apr. 3, 1934 |
| 2,057,430 | Herrera | Oct. 13, 1936 |
| 2,244,520 | Ferrante | June 3, 1941 |
| 2,283,967 | Brown | May 16, 1942 |
| 2,328,018 | Irmscher | Aug. 31, 1943 |
| 2,484,054 | Sharp | Oct. 11, 1949 |
| 2,738,721 | Hubbard | Mar. 20, 1956 |

FOREIGN PATENTS

| | | |
|---|---|---|
| 61 | Great Britain | 1874 |
| 972,257 | France | Aug. 23, 1950 |